United States Patent
Kimball

[11] Patent Number: 5,483,503
[45] Date of Patent: Jan. 9, 1996

[54] SPLIT CHIP INVERTER FOR EL LAMP

[75] Inventor: Robert A. Kimball, Scottsdale, Ariz.

[73] Assignee: Durel Corporation, Chandler, Ariz.

[21] Appl. No.: 497,262

[22] Filed: Jun. 30, 1995

[51] Int. Cl.⁶ .............................. G04B 19/30; G09G 3/10; G09G 3/36
[52] U.S. Cl. ........................ 368/67; 368/227; 315/169.3; 345/102
[58] Field of Search ............................ 368/67, 226, 227; 315/169.3, 169.1; 345/76, 102

[56] References Cited

U.S. PATENT DOCUMENTS

| | | | |
|---|---|---|---|
| 4,527,096 | 7/1985 | Kindlmann | 315/169.3 |
| 4,529,322 | 7/1985 | Ueda | 368/225 |
| 4,995,016 | 2/1991 | Watanabe | 368/67 |
| 5,093,612 | 3/1992 | Herold | 323/222 |
| 5,265,071 | 11/1993 | Thorgersen et al. | 368/67 |
| 5,339,294 | 8/1994 | Rodgers | 368/67 |
| 5,384,577 | 1/1995 | McLaughlin et al. | 345/102 |

Primary Examiner—Vit W. Miska
Attorney, Agent, or Firm—Cahill, Sutton & Thomas

[57] ABSTRACT

An electronic watch, either digital or analog, includes an EL lamp powered by a split chip inverter having a low voltage portion incorporated into a first semiconductor chip and a high voltage portion incorporated in a second semiconductor chip. The first semiconductor chip preferably includes all the other low voltage circuitry of the watch, e.g. timer/divider circuitry and logic for driving a display.

5 Claims, 1 Drawing Sheet

SPLIT CHIP INVERTER FOR EL LAMP

BACKGROUND OF THE INVENTION

This invention relates to an inverter for supplying power to an electroluminescent (EL) lamp and, in particular, to an inverter including low voltage transistors on a first semiconductor chip and one or more high voltage transistors on a second semiconductor chip for driving the EL lamp.

Many electronic watches include an EL lamp for backlighting the face of the watch, such as a liquid crystal display or an analog dial. An EL lamp provides glare-free, uniform lighting across the entire face of the watch, is relatively thin, and consumes very little power. The disadvantage of an EL lamp is the need for a high voltage alternating current to drive the lamp. An EL lamp typically requires eighty volts or more to produce the desired brightness and the battery in a watch typically has a voltage of three volts or less. An inverter is used to convert low voltage direct current from the battery into a high voltage alternating current for the EL lamp.

An electronic watch typically includes an oscillator, a counter or divider circuit, and other low voltage semiconductor devices. Also fitting within a watch case are a battery and a mechanical resonator for controlling the frequency of the oscillator. Adding an EL lamp to a watch not only adds the lamp itself but also adds several additional components that must fit within a case, such as an inductor and the inverter circuitry. Style considerations prevent a watch case from being arbitrarily enlarged.

Electronic watches of the prior art typically include a timer chip and an inverter chip. The timer chip performs the clock functions of the watch and the inverter chip powers the EL lamp. Custom integrated circuits are used to reduce size and cost and to minimize the number of parts. Size is further reduced by using bare chips; that is, chips that are not packaged.

A typical inverter circuit for watches includes what is known as a "flyback" or boost circuit in which the energy stored in an inductor is supplied to the EL lamp as a small pulse of current at high voltage. Specifically, an inductor and a switch transistor are connected in series across the battery in a watch. The junction of the switch transistor and the inductor is coupled to the EL lamp through a diode. When the transistor shuts off, the collapsing field in the inductor generates a high voltage pulse proportional to $\delta i/\delta t$. A series of such pulses charges the lamp and the lamp glows. The polarity of the high voltage pulses is reversed periodically by additional circuitry to produce alternating current. The switch transistor is turned on and off at high frequency, four kilohertz or more, to minimize the size of the inductor.

Although the basic inverter circuit is relatively simple, the actual implementation of the circuit is more complicated. Prototypes of an inverter are typically made with discrete devices or with standard integrated circuits but production quantities of an inverter are least expensive when as much of the inverter as possible is incorporated into a single semiconductor chip as a custom integrated circuit.

The process for manufacturing custom integrated circuit begins with "design rules" for laying out devices on a wafer. One design rule is the minimum line width that can be accommodated in a particular process. For example, high voltage devices typically have a minimum line width of 5 microns ($5.0\mu$ or $5\times10^{-4}$ millimeters). A low voltage device, such as a logic array, may have a minimum line width as small as $0.3\mu$.

A second aspect of designing a custom integrated circuit is the library of standard circuits that are used. These are small circuits whose fabrication and performance are well established and tested and the circuits are used as building blocks for producing a custom integrated circuit. For example, a flyback inverter implemented as a custom integrated circuit typically includes a plurality of transistors that provide ancillary functions such as timing, logic, coupling or buffering, pulse shaping, temperature compensation, and feedback for stability. The transistor count in a "real-life" custom inverter chip can exceed two hundred even though the basic circuit may be illustrated in a patent or other literature as containing only five or six transistors. The ancillary circuit elements significantly increase the size of the chip.

The majority of the transistors in an inverter operate at low voltage. An inverter also includes switching transistors that operate at high voltage and therein lies a problem. High voltage transistors are physically larger than low voltage transistors. High voltage transistors are not implemented with sub-micron design rules but with a minimum line width of about $5\mu$, further increasing the size of the device. As used herein, a high voltage transistor is a transistor that can operate at ten volts or more.

Processes which produce fairly small low voltage transistors yield physically large high voltage transistors when all are made on the same chip. Conversely, processes which produce small high voltage transistors yield large low voltage transistors when all are made on the same chip. Either way, the area of the resulting chip is large.

As noted above, patents or other literature typically illustrate a basic circuit as it might be implemented in discrete form for proof of concept, not as implemented in a custom integrated circuit. Although the basic circuit is more easily understood because it is not obscured in a lot of needless detail, it is a misinterpretation of the literature to think that a commercially viable inverter requires so few components.

A commercially available, digital, electronic watch typically includes a clock chip having an area of about 25,000 square mils and an inverter chip having an area of about 3,700 square mils. A commercially available analog electronic watch typically includes a clock chip having an area of about 4,000 square mils. The cost of a chip is essentially a linear function of area: the more chips one can obtain from a single wafer, the lower the cost per chip. The electronic watch market is intensely price competitive and the cost of a watch "assembly", the inner workings without a case and wristband, is critical. Any reduction in cost becomes profit, either directly or as a sale obtained from a price reduction.

In the prior art, PCT application PCT/US93/04698 (McLaughlin et al.) disclose a microprocessor controlled pager including an inverter for an EL lamp. U.S. Pat. No. 5,093,612 (Herold) discloses a selective call receiver including a logic circuit and an inverter for powering an EL lamp. U.S. Pat. No. 4,529,322 (Ueda) discloses a booster circuit for powering an EL lamp. The booster circuit includes a CMOS controller and a bipolar driver circuit. U.S. Pat. No. 4,527,096 (Kindlmann) discloses driving an inverter from a counter/divider in a watch chip. The Kindlmann patent describes one of the few circuits known to be produced commercially. In its commercial form, the inverter includes many more transistors than shown in the patent drawings and includes high voltage transistors and low voltage transistors on a single chip. Unpatented, commercially available inverters for watches also include high voltage transistors and low voltage transistors on the same chip.

In view of the foregoing, it is therefore an object of the invention to reduce the area of the high voltage chip used in electronic watches having an EL lamp.

Another object of the invention is to provide an electronic watch including an inverter having low voltage control circuitry on a semiconductor chip, wherein the chip includes all the low voltage circuitry for the watch.

SUMMARY OF THE INVENTION

The foregoing objects are achieved in the invention in which an EL lamp in an electronic watch is powered by an inverter having a high voltage portion and a low voltage portion. The low voltage portion is incorporated into a first semiconductor chip and only the high voltage portion is incorporated into a second semiconductor chip. The second chip has an area approximately forty percent smaller than high voltage chips for watches in the prior art. The invention can be incorporated into digital or analog electronic watches.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
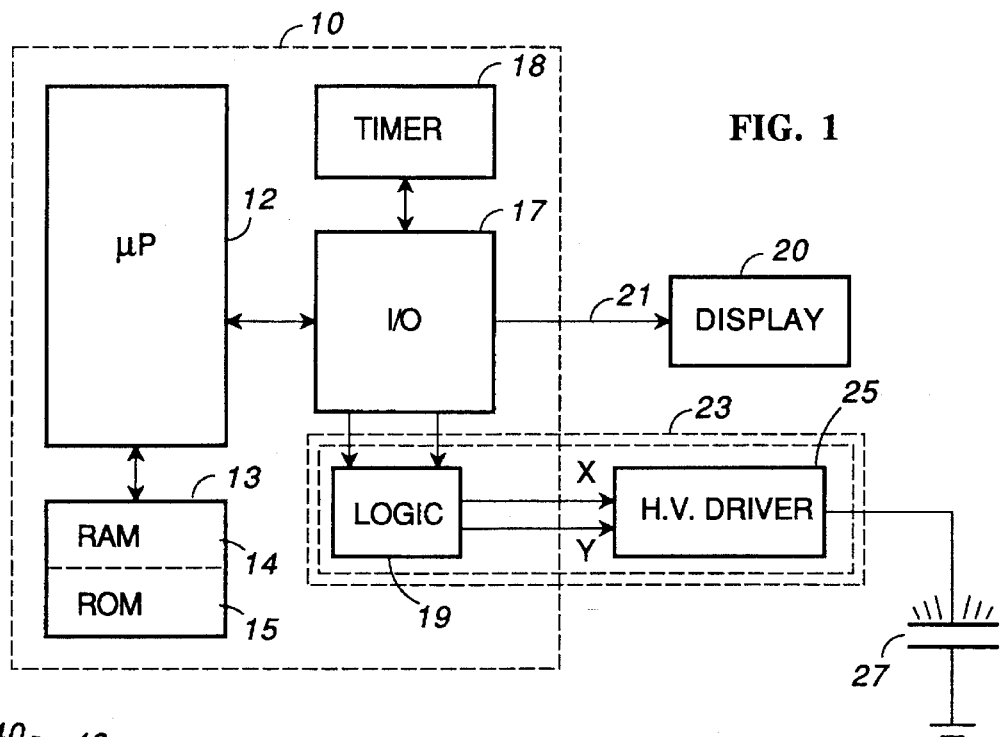
FIG. 1 is a block diagram of a digital, electronic watch constructed in accordance with a preferred embodiment of the invention.

In FIG. 1, low voltage chip 10 includes microprocessor 12 and memory 13, such as random access memory (RAM) 14 and read only memory (ROM) 15. Microprocessor 12 is coupled through I/O (input/output) interface 17 to liquid crystal display 20 by output line 21, and is coupled internally to timer 18 and logic 19. Microprocessor 12 and operates at a frequency of 32,768 hertz, or some integer multiple thereof. This frequency (numerically equal to $2^{15}$) is easily divided in a binary counter to provide a pulse having a duration of one second. Timer 18 includes a suitable clock circuit for providing date, time, and alarm functions.

Inverter 23 includes low voltage logic 19, which is part of chip 10, and high voltage driver 25, which is implemented on a separate semiconductor chip. Logic 19 provides control signals to driver 25 for varying the pulse width, duty cycle, or frequency of the voltage applied to EL lamp 27, thereby controlling the brightness of the lamp, e.g. for blinking or dimming.

In the prior art, inverter 23 would be implemented on a single chip. In accordance with the invention, all low voltage circuitry is separated from driver 25 and included on chip 10. Logic 19 adds very little area to chip 10 and is much smaller than if it were included with driver 25, as explained above. Driver 25 typically occupies an area of 2,200 square mils, a forty-one percent reduction in area from the 3,700 square mils of the prior art. The logic circuitry added to chip 10 increases the area of the chip very little, from 25,000 square mils to 25,500 square mils or two percent. The low voltage circuitry is much less expensive per wafer than the high voltage circuitry and there is very little cost penalty, if any, for the increased area.

Figure 2:
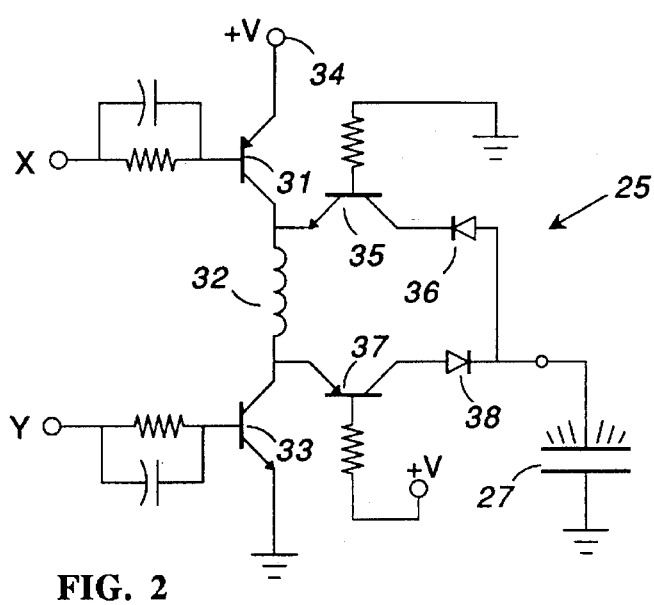
FIG. 2 is a schematic of a driver suitable for use in the invention.

FIG. 2 illustrates a high voltage driver suitable for use in the invention and is similar to a driver disclosed in U.S. Pat, No. 5,313,117 (Kimball). Driver 25 includes transistor 31, inductor 32, and transistor 33 connected in series between voltage source 34 and ground. Inductor 32 is alternately connected through transistors 35 and 37 to lamp 27. Diode 36 is connected in a series with transistor 35 for preventing the transistor from operating in the inverse active mode, i.e. preventing transistor 35 from conducting current from the ground terminal through the forward bias based-collector junction when the voltage on lamp 27 is negative. Similarly, diode 38 prevents transistor 37 from operating in the inverse active mode when the voltage on lamp 27 is positive and greater than the battery voltage. The transistors, resistors, and diodes can be implemented on a single chip. The inductor and capacitors are external devices coupled to the chip on a printed circuit board.

Logic 19 (FIG. 1) provides a series of pulse bursts alternately on output lines "X" and "Y". These bursts are coupled to the bases of transistors 31 and 33 and cause the transistors to conduct alternately, thereby providing positive and negative half wave voltages to lamp 27.

Figure 3:
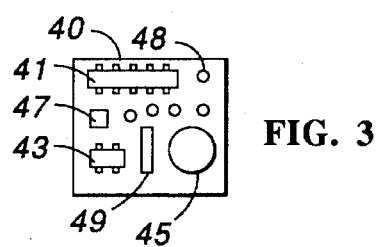
FIG. 3 illustrates a circuit board implementing a digital watch constructed in accordance with the invention.

FIG. 3 illustrates a small circuit board for use in a watch. Circuit board 40 includes low voltage chip 41 and high voltage chip 43 powered by battery 45. Non-semiconductor components include crystal 47, capacitor 48, and inductor 49. As in the prior art, only two chips are used but, unlike the prior art, the circuitry is rearranged to separate high voltage and low voltage transistors into separate chips.

Figure 4:
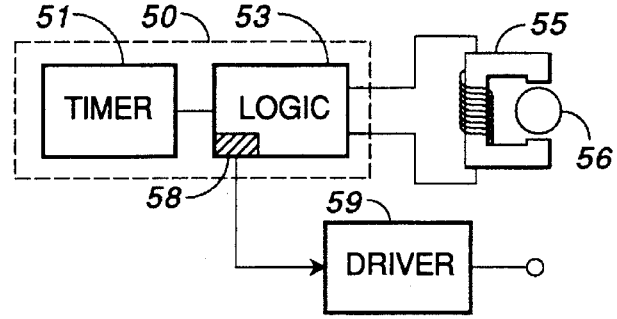
FIG. 4 is a block diagram of an analog, electronic watch constructed in accordance with the invention.

The invention is not limited to digital electronic watches. FIG. 4 illustrates the works of an electronic, analog watch in which low voltage chip 50 includes timer 51 and logic 53. Timer 51 is a crystal controlled oscillator providing pulses at a frequency of 32,768 hertz, or some integer multiple thereof, to logic 53 which is essentially a binary divider for producing pulses having a duration of one second. These pulses are coupled to an escapement including field coil 55 and armature 56, which is coupled to the second hand (not shown) of the watch. Logic 53 includes the pulse generating and timing circuitry, indicated by cross-hatched area 58, for controlling high voltage driver 59.

Driver 59 can be driver 25, as illustrated in FIG. 2, or other, suitable circuit. Driver 59 is a separate chip from chip 50 and, as in the embodiment of FIG. 1, the area of the high voltage chip is significantly less than in the prior art.

Having thus described the invention, it will be apparent to those of skill in the art that various modifications can be made within the scope of the invention. Although an EL lamp is included in an electronic watch, the lamp is not always lit. A normally open switch, not shown, mechanically coupled to a button on a watch case, is used to turn on the lamp as needed.

What is claimed as the invention is:

1. In an electronic watch including a battery, a timer, a display, an electroluminescent lamp for backlighting the display, and an inverter for supplying power to the electroluminescent lamp, the improvement comprising:

said inverter having a high voltage portion and a low voltage portion;

wherein said low voltage portion and said timer are implemented in a first semiconductor chip and only said high voltage portion is implemented in a second semiconductor chip.

2. The electronic watch as set forth in claim 1 wherein said electronic watch includes a microprocessor.

3. The electronic watch as set forth in claim 3 wherein said microprocessor is implemented on said first semiconductor chip.

4. The electronic watch as set forth in claim 2 wherein said display is a liquid crystal display coupled to said microprocessor.

5. The electronic watch as set forth in claim 1 wherein said display is an analog dial.

* * * * *